United States Patent
Browning

(10) Patent No.: US 6,169,475 B1
(45) Date of Patent: Jan. 2, 2001

(54) SYSTEM AND METHOD FOR ACTIVE DETECTION OF CONNECTION TO A NETWORK

(75) Inventor: Kurt R. Browning, Newbury Park, CA (US)

(73) Assignee: Xircom, Inc., Thousand Oaks, CA (US)

( * ) Notice: Under 35 U.S.C. 154(b), the term of this patent shall be extended for 0 days.

(21) Appl. No.: 09/050,290

(22) Filed: Mar. 30, 1998

(51) Int. Cl.[7] ..................................... G08B 23/00
(52) U.S. Cl. .................. 340/286.02; 340/635; 340/500; 340/661; 370/245
(58) Field of Search ..................... 340/500, 635, 340/657, 660, 661, 664, 286.02; 370/245, 445

(56) References Cited

U.S. PATENT DOCUMENTS 4,779,088 * 10/1988 Restrepo ............................ 340/825.5
5,185,735 * 2/1993 Ernst ....................................... 370/13
5,329,519 * 7/1994 I'Anson .................................. 370/13
5,751,698   5/1998 Cushman et al. .
5,822,302 * 10/1998 Scheetz et al. ....................... 370/245
5,848,098  12/1998 Cheng et al. .
5,917,808 * 6/1999 Kosbab ................................ 370/254

* cited by examiner

Primary Examiner—Julie Lieu
(74) Attorney, Agent, or Firm—Clayton, Howarth & Cannon, P.C.

(57) ABSTRACT

An apparatus and method for detecting a connection to a data transmission network functions by detecting the network signal energy on a network cable while avoiding the problems of excessive power consumption and generation of excessive electrical noise. By monitoring the receive network lines and determining if there is electrical energy on the cable in the form particular to the type of network supported by the network adapter card, the host computing device can power-down the transceiver associated with the network adapter card until an active network connection is detected.

60 Claims, 6 Drawing Sheets

**10 MBPS DATA
SIGNAL WAVEFORM**

SYSTEM AND METHOD FOR ACTIVE DETECTION OF CONNECTION TO A NETWORK

BACKGROUND

1. The Field of the Invention

This invention relates to digital computing equipment. More particularly, the present invention relates to devices used to interconnect computing equipment in a network configuration.

2. Background Information

The proliferation of computers has made great computing power available to large numbers of users. The flexibility and capabilities of personal computers is greatly enhanced when the computers are interconnected to each other. When a plurality of computers are interconnected to share information, it is generally referred to as a network. Local Area Networks (LANs) are those networks which connect computers over a relatively small geographic areas and Wide Area Networks (WANs) are those networks which connect computers over a relatively large geographic area. With millions of computers being connected to each other as part of various networks, efficient use of computing resources becomes very important.

In order to allow a computer to be connected to a network, the computer must be provided with the appropriate network hardware. Such hardware is referred to as a network adapter card. A network adapter card may adhere to many different network standards, such as one of the popular Ethernet network standards or one of the Token ring network standards. A network adapter card also adheres to one of the many standards which allow the network adapter card to communicate with the computing device. The standards which allow the network adapter card to communicate with the computing device include, for example, the PCI standard, the ISA standard, the PCMCIA and CARDBUS standards, the various IEEE RS standards (e.g. RS-232), as well as other standards. All of these standards are examples of standards which are well-known in the industry but the recitation of these standards is not intended to be a comprehensive list of those standards which are applicable to the present invention.

Represented in FIG. 1 is a diagram showing the general arrangement of a host computer, a network adapter card, and a connection to the media conveying a network signal used in the case of the Ethernet network standard. It is to be understood that the arrangement represented in FIG. 1 is merely exemplary and not limiting of the applications of the present invention or is indicative of any particular network arrangement.

As represented in FIG. 1, a network adapter card 10 resides in a host computer 12. Network adapter cards, such as network adapter card 10, used in connection with personal computers, such as host computer 10, typically contain a transceiver 14 which interfaces between the media access controller (MAC) 16 on the network card 10 and the physical network media 18 (e.g. the media carrying the network signals (twisted pair cable, coaxial cable, or fiber optic cable)). The transceiver 14 is also sometimes referred to as a Medium Attachment Unit. In the example of FIG. 1, when implementing the Ethernet network standard the transceiver 14 performs the task of transmitting the data frames onto the cable and receiving data frames from it. The transceiver 14 also monitors the signal level on the medium, and detects network collision and other error conditions, all as known in the industry. The transceiver 14 can either be external to, or on-board, the network adapter card 10. Other components which are included on the network adapter card 10 are represented at 22.

Besides functioning to convert between the signals of the MAC 16 and the signals that appear on the network media 18, the transceiver 14 is involved in establishing the network connection in the first place. When the host computer 12 initializes the network card 10, the transceiver 14 continuously monitors the network media 18 while typically sending out its own broadcast packets until there is a response from the network and a connection established. Some transceivers 14 that support more than one type of connection call the process of determining which types of signals must be used on the network "autonegotiation." It is to be understood that the functions carried out by the network adapter card 10 can be integral with other components of the host computer 12 or other type of computing device.

The advent of PCMCIA cards and CardBus cards, collectively known as PC Cards, has brought networking to the portable computer user. Such portable computers are battery powered devices which are small, easily carried devices often the size of a notebook or smaller. PC cards are compact hardware devices having dimensions of about 2.1 inches by about 3.4 inches with a thickness of only 3.5 mm, 5 mm, 10.5 mm or some other dimensions allowed by the promulgated PCMCIA standard. The PC Card typically slides into a socket provided on the housing of the computer to allow easy replacement of one PC Card with another PC Card. Increasingly, users of desktop computers, as well as other electronic devices, are also using such PC Cards to add hardware devices to their computing devices.

It is common to add a network adapter card to a portable computer as a PC Card. Some of these PC Cards also contain a modem and are known as network/modem combination, or "combo," cards. Often the portable computer user is only using the modem portion of the PC Card, or the user simply keeps the PC Card in the host computer even when the PC Card is not connected to any network. Since the network PC Card is installed in the PC Card slot on the computer, the PC Card still gets initialized by the host computer, and the transceiver (see 14 at FIG. 1) on the card continuously attempts to find a network connection, even if no connection to network media is present. The amount of power used by the transceiver is great enough to unsatisfactorily reduce the battery life of portable computers when being powered from the internal battery. In addition, because network and modem components on a combination network/modem card are in such close proximity, the constant attempts of the transceiver to find a network connection creates electrical noise that can adversely interfere and affect modem performance since the circuit board in the PC Card contains the components for both the modem and the network adapter.

To reduce undesirable power consumption and electrical noise when the transceiver is not needed, most transceivers can enter a low-power mode. However, the circuitry needed to establish a network connection is disabled in a transceiver when the transceiver is in the low-power mode. While it has been suggested that it is possible to put the transceiver into the low-power mode and periodically give it full power to check for a cable being connected to the network adapter card, this suggestion is impractical since in order to significantly reduce power consumption and minimize electrical noise, these full power checks are so infrequent that it results in an unacceptable delay in connecting to a network when a cable carrying active network signal is actually attached to the network adapter card. Additionally, the software overhead required of the host computer for such an ongoing operation would hurt the performance of all other tasks the host computer is running. Moreover, merely mechanically detecting when a network cable is connected to the network adapter card also provides unsatisfactory performance since there is no guarantee that the other end of the cable is actually connected to a network hub, switch, or router and that the cable is carrying an active network signal.

In view of the foregoing, it would be an advance in the art to provide a system and method for reducing the power consumed by a network adapter card when the network adapter is not actively connected to a network.

BRIEF SUMMARY AND OBJECTS OF THE INVENTION

In view of the above described state of the art, the present invention seeks to realize the following objects and advantages.

It is a primary object of the present invention to reduce the power consumed by a network adapter when the network adapter is not actively connected to the network.

It is also an object of the present invention to provide a system and method for reducing the power consumed by a transceiver in a network adapter when the transceiver is not actively connected to a network.

It is a further object of the present invention to extend the battery life of a battery operated portable computing device by reducing the power required by a network adapter when the adapter is not connected to the network.

It is another object of the present invention to detect when an energy signature is present or absent on a network cable.

It is also an object of the present invention to provide a system and method for detecting when a network signal is present on a network conveying medium which requires few additional components beyond those required to make a connection to the network.

It is a further object of the present invention to provide a system and method for detecting when a network signal is present on a network conveying medium which draws little power and which does not create excessive interfering electrical noise.

It is a yet further object of the present invention to provide a system and method for detecting when a network signal is present on a network conveying medium which is particularly suited for incorporation into a PC Card.

It is also an object of the present invention to provide a system and method for detecting when an Ethernet network signal is present on a network conveying medium.

It is a still further object of the present invention to provide a single circuit which can detect when either a first network signal or a second network signal is actively present on a network conveying medium.

These and other objects and advantages of the invention will become more fully apparent from the description and claims which follow, or may be learned by the practice of the invention.

The present invention provides an efficient and elegant structure and method for detecting the presence of an active connection to a data transmission network. The present invention functions by detecting the network signal energy on a network medium, such as a network cable. The present invention solves the problems of excessive power consumption and generation of excessive electrical noise. The embodiments of the present invention give an indication of whether or not an active network connection is present on a network cable. Advantageously, the embodiments of the present invention do not attempt to create a network connection; The embodiments of the present invention monitors the receive network lines to determine if there is electrical energy on the cable in the form particular to the type of network supported by the network adapter card. The embodiment of the present invention then provides a hardware signal that is used by other logic on the network adapter card to indicate the active network connection. One preferred function of the other logic components included on the network adapter card is to interrupt the host computer when a change in cable energy status is detected.

The present invention allows the host computer to put the transceiver into the low-power mode continuously when there is no active signal present, yet permits the host computer to quickly power up the transceiver when a cable carrying an active network signal is connected to the network adapter card. The power consumption of the embodiments of the present invention and any supporting logic is considerably less than that of the transceiver at full power.

In accordance with one aspect of the present invention, a means for making a connection to a network medium, a means for comparing any signal found on the network medium to a predetermined standard, and a means for signaling the computing device when any signal found on the network medium is an active network signal are all preferably included in the embodiments of the present invention.

The embodiments of the present invention can be incorporated into a network adapter card which is configured internally to the host computing device or as a PC Card, or in any other configuration which meets the needs of a particular application. The embodiments of the present invention are particularly applicable for use with networks compliant with the popular Ethernet network standards but other network standards can also benefit from the present invention.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

Figure 1:
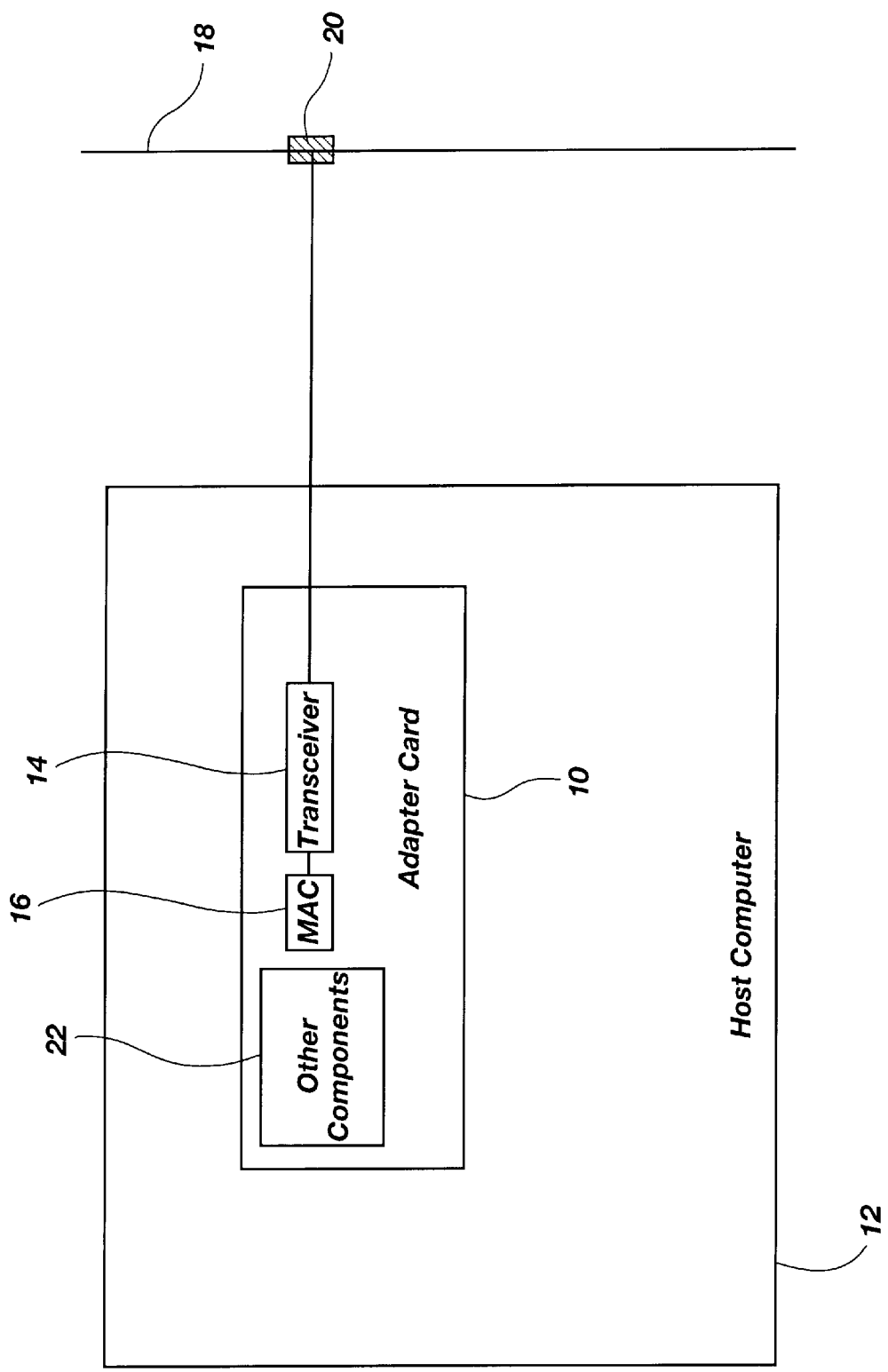
FIG. 1 is a diagrammatic representation of a network adapter card, a host computer, and a network connection.
Figure 2:
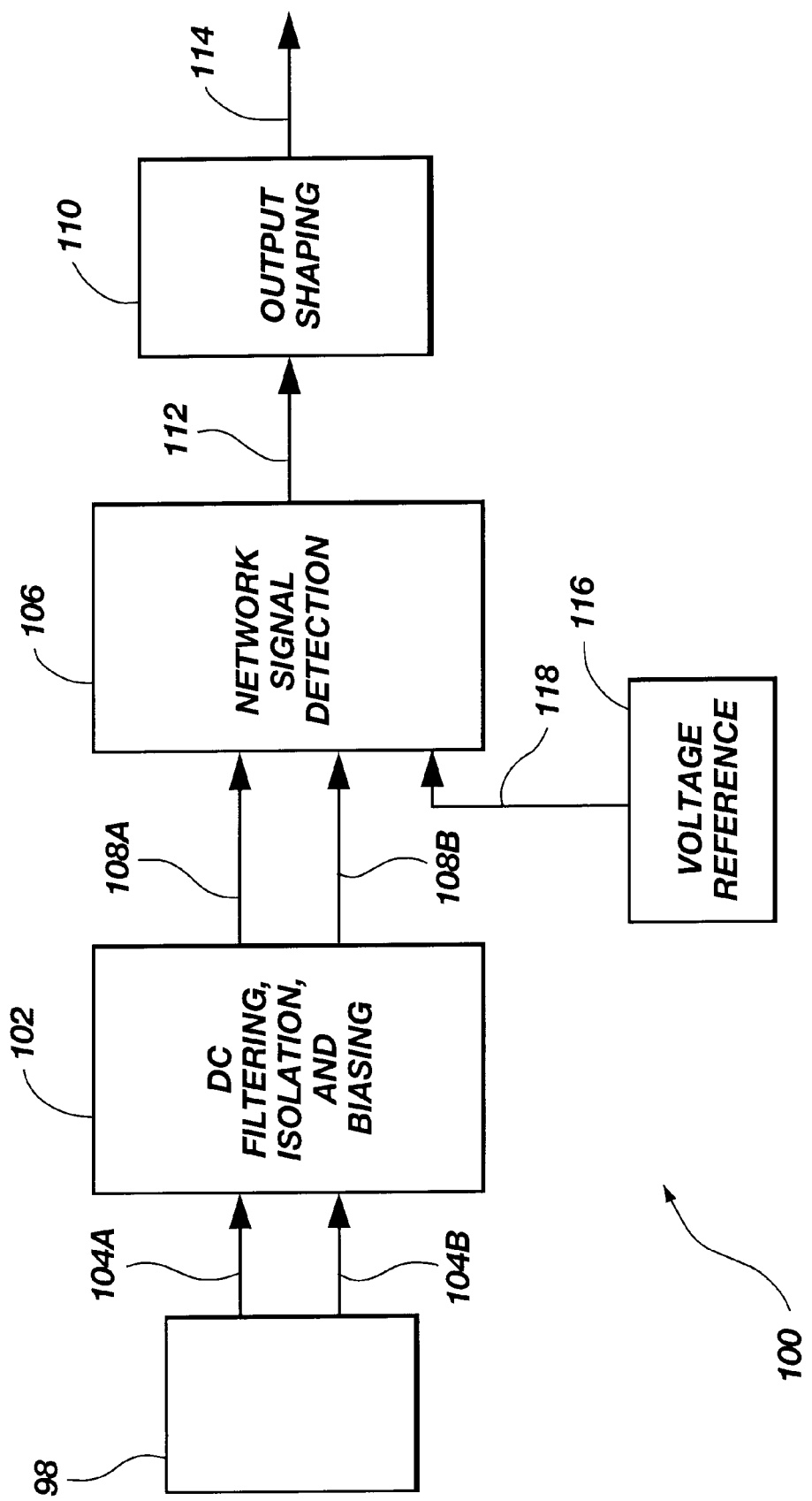
FIG. 2 is a block diagram showing the configuration of a presently preferred embodiment of the system and method for active detection of connection to a network of the present invention.

Reference will first be made to FIG. 2 which is a block diagram showing the configuration of a presently preferred embodiment of the present invention, generally indicated at 100. It will be appreciated that the block diagram represented in FIG. 2 is merely exemplary of the present invention and is not intended to be limiting of the scope of the present invention. Those skilled in the art will appreciate that many different components and configurations can be arrived at to carry out the present invention. Moreover, all structures, whether now know or which become known in the future, which perform functions which are similar or equivalent to the functions carried out by the structures represented in FIG. 2 are intended to fall within the scope of the present invention.

Represented in FIG. 2 is a network 98, which is preferably a network complying with one of the Ethernet network standards. The connection to the network 98 is made using two conductors 104A&B. It will be appreciated that the connection to the network represented in FIG. 2 is made in addition other customary connections made to the network by the network adapter. The connection to the network represented in FIG. 2 is just one preferred example of a means for making a connection to the network medium and those skilled in the art will appreciate that there are many other structures now known in the art or which will become available in the art which can carry out similar or equivalent functions and all such structures are intended to fall within the scope of a means for making a connection to the network medium.

The signal from the conductors 104A&B is applied to circuit 102 which preferably provides DC filtering, isolation, and a DC bias. Circuit 102 provides the isolation function to ensure that the connection to the conductors 104A&B does not cause any interference or change to the signals which are present on the network 98. Importantly, the network signals which are present on the conductors 104A&B are not altered by the presence of the embodiment of the present invention. Circuit 102 also provides an ideal DC bias under no-signal conditions for the detection circuit 106 which carries out the network detection function. The DC bias which is preferred for the network detection function may be different than the DC bias the network adapter transceiver provides. The signal output from the circuit 102 is conveyed by conductors 108A&B to the circuit 106 for detection when the network signal is input to the network adapter.

The network signal detection circuit 106 compares AC signal levels with a known reference voltage to detect the presence of a network signal on the conductors 104A&B. A reference voltage is preferably generated by a reference voltage circuit 116 and conveyed to the network signal detection circuit 106 as represented by line 118. More information on the preferred configurations for carrying out the functions of the network signal detection circuit 106 will be provided shortly. The output of the network signal detection circuit 106 is conveyed as represented line 112 to an output shaping circuit 110 which carries out output shaping. The output shaping circuit 110 outputs a energy detection signal as represented by line 114 which indicates whether the a network signal is present on the conductors 104A&B. The energy detection signal is preferably tailored to the particular requirements of the application to which the embodiment of the present invention is employed. Thus, in one preferred application of the present invention the energy detection signal is conveyed to the host computing device so that the host computing device can direct the transceiver in the network adapter card to be in a full-power mode or a low-power mode.

The network detection circuit 106 represented in FIG. 2 is just one preferred example of a means for comparing any signal found on the network medium to a predetermined standard and those skilled in the art will appreciate that there are many other structures now known in the art or which will become available in the art which can carry out similar or equivalent functions and all such structures are intended to fall within the scope of a means for comparing any signal found on the network medium to a predetermined standard.

One preferred application of the system 100 represented in FIG. 2 is the detection of either 10 Mbps or 100 Mbps Ethernet signals on a CardBus PC Card network adapter. The CardBus PC Card network adapter of this example preferably uses an Ethernet transceiver circuit which can be selected from those available in the industry by those skilled in the industry. The preferred CardBus PC Card network adapter of this example also includes a custom application specific integrated circuit (ASIC) which has been fabricated to carry out the function of interfacing between the host computer and the Ethernet MAC provided in the CardBus PC Card network adapter.

In the preferred embodiment described herein, the network signal detection circuit 106 outputs on conductor 112 an active-low signal designated as /ENERGY_DETECT which is output to the ASIC via conductor 114. Also in this preferred embodiment, if the /ENERGY_DETECT signal is high, the ASIC assumes no network signals are present and appropriate action, such as keeping the transceiver in a low-power state, is maintained. If the /ENERGY_DETECT signal is low, or pulses low at least twice in a programmable time period, it is assumed the network adapter card is connected to an active Ethernet hub, switch, or router and appropriate action, such as keeping the transceiver fully active, is taken.

The output shaping circuit 110 represented in FIG. 2 is just one preferred example of a means for signaling the computing device when any signal found on the network medium is an active network signal and those skilled in the art will appreciate that there are many other structures now known in the art or which will become available in the art which can carry out similar or equivalent functions and all such structures are intended to fall within the scope of a means for signaling the computing device when any signal found on the network medium is an active network signal.

With an appreciation of the foregoing, it will be understood that the system of the present invention represented in FIG. 2 advantageously interfaces with the appropriate device driver residing in the host computer as will now be explained. When the network adapter card including the system represented in FIG. 2 is first initialized, and at any time when there is a change in the presence or absence of network energy detection (i.e. a change in the /ENERGY_DETECT signal), the ASIC interrupts the host system. The device driver software, which can be readily adapted (if necessary) to carry out the functions of the present invention by those skilled in the industry, reads the ASIC for network energy detection status and determines whether or not to fully power the transceiver.

Importantly, the embodiments of the present invention must provide the network energy detection indication not only before a connection is established, but also while the network adapter card is attached to an active network. It is preferred that the system of the present invention represented in FIG. 2 does not directly control the transceiver in the network adapter card; It provides the host computer system with an indication of whether the network adapter card is connected to an active network. Thus, under the appropriate circumstances, the host computer could choose to ignore the indication provided by the system represented in FIG. 2 and always fully power up the transceiver, for example when the host computer is not being powered by internal batteries.

Figure 3:
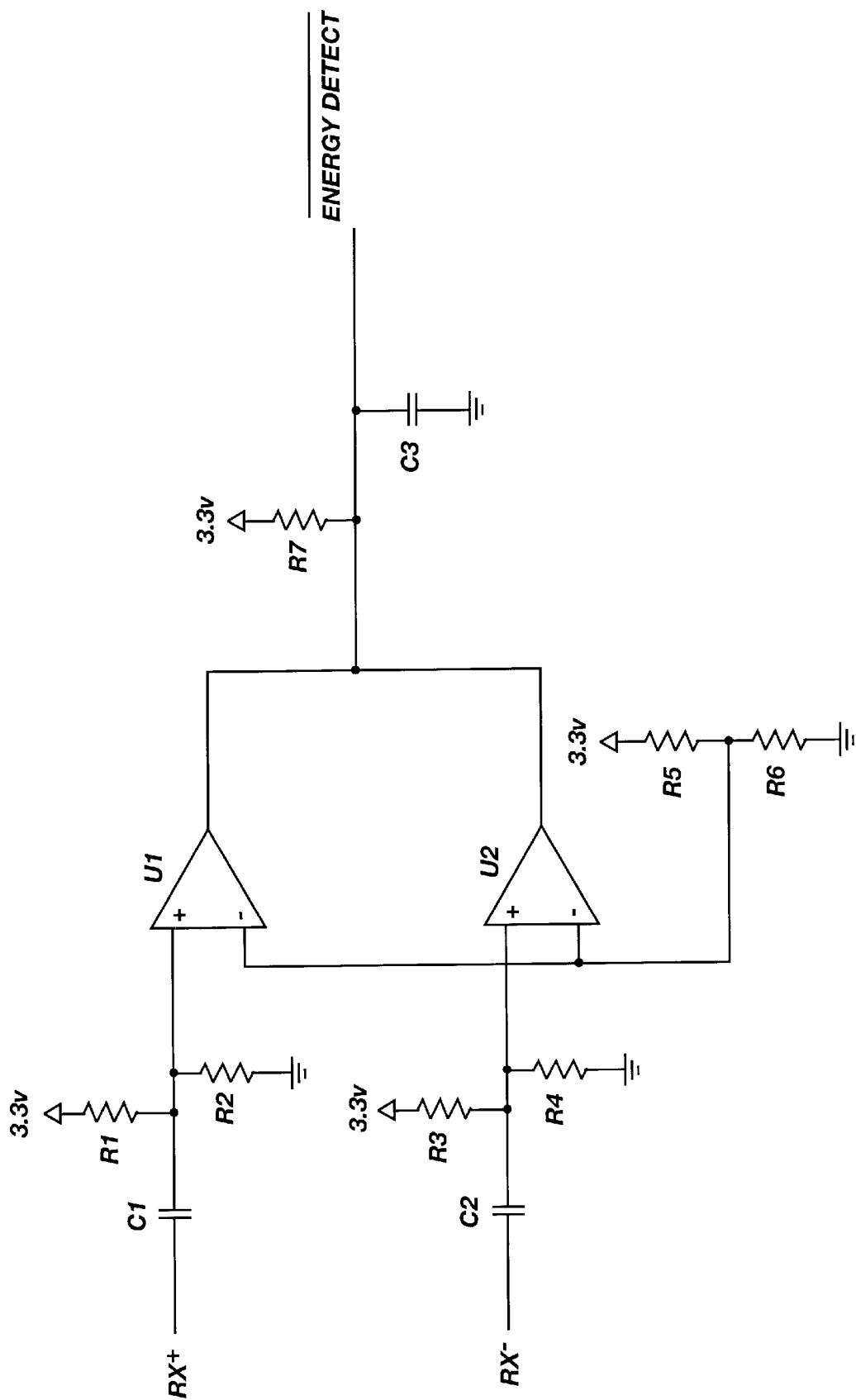
FIG. 3 is a detailed schematic diagram of another presently preferred embodiment of the present invention configured for use in a particular application.

FIG. 3 will be referred to next to provide a presently preferred example of how to carry out the present invention in one preferred application. It is to be understood that FIG. 3 is a detailed schematic diagram representing just one example of how to carry out the present invention. Understanding that FIG. 3 is just one example of the present invention, an explanation of the detailed schematic diagram will be provided next. While the exemplary detailed schematic diagram represented in FIG. 3 is described for use with 10 Mbps and 100 Mbps Ethernet network signals, those skilled in the art will readily be able to use the teachings set forth herein to utilize the present invention for use with Gigabit Ethernet network signals as well as other network signals known in the industry. Information regarding such Ethernet standards can be obtained from the following publications: all publications promulgated pursuant to IEEE 802.3z and 802.3ab working groups and all published revisions of the IEEE 802.3 standard, all of which are now incorporated herein by reference in their entireties.

In FIG. 3, the positive and negative differential receive signals provided on the network are represented at $RX^+$ & $RX^-$, respectively. The positive and negative differential receive signals $RX^+$ & $RX^-$ are each capacitively coupled to the non-inverting inputs (indicated at the plus inputs in FIG. 3) of two comparators, U1 and U2. Capacitors C1 and C2 function to capacitively couple the signals to the comparators U1 and U2. The capacitors C1 and C2, along with resistors R1, R2, R3, and R4, are one preferred example of a DC filtering, isolation and biasing circuit, such as represented at 102 in FIG. 2.

It is to be appreciated that the capacitors C1 and C2, along with resistors R1, R2, R3, and R4, are just one preferred example of carrying out a means for DC filtering of the signal, a means for providing electrical isolation, and a means for providing a DC bias and those skilled in the art will appreciate that there are many other structures now known in the art or which will become available in the art which can carry out similar or equivalent functions and all such structures are intended to fall within the scope of the present invention.

In this preferred example, the values of capacitors C1 and C2, which are preferably substantially the same, are selected so they are high enough to pass the AC component of both 10 Mbps and 100 Mbps Ethernet network signals without significant attenuation. Resistors R1 and R2 function to set a DC bias for the comparator U1 on the positive differential receive signal $RX^+$. In the described preferred application of the present invention, the DC bias voltage is preferably chosen as the midway point between the 3.3V power rail and ground, or 1.65V. This is because rail-to-rail input comparators U1 and U2 are preferably selected for use this circuit.

In the preferred example represented in FIG. 3, resistor R1 must equal resistor R2 and the value must be significantly less than the input impedance of the comparator U1 to achieve a steady 1.65V bias. However, the value of resistor R1 and resistor R2 should also be as high as possible to conserve power and minimize the AC load on the network signals. In a similar manner, resistor R3 and resistor R4 provide bias for the comparator U2 on the negative differential receive signal $RX^-$.

Still referring to FIG. 3, comparators U1 and U2 are one preferred example of the network signal detection circuit 106 represented in FIG. 2 and resistors R5 and R6 are one preferred example of a voltage reference circuit 116 also represented in FIG. 2. Comparators U1 and U2 are preferably open-drain comparators, as are known in the industry or as can be fabricated in accordance with principals which are well-known in the industry. It is to be understood that many devices other than the exemplary comparators can be used within the scope of the present invention. Advantageously, the use of the open drain comparators allows their outputs to be directly tied together. Moreover, the input impedance of the comparators U1 and U2 should be high enough that undesirable loading of the network signals does not occur.

From an understanding of the forgoing, it will be appreciated that the common output of the comparators U1 and U2 will go low if either comparator U1 or U2 drives its output low. In this preferred example, the frequency rating of the comparators U1 and U2 should be just fast enough to respond to the network signals since higher speed comparators increase power consumption.

Resistors R5 and R6 provide a voltage reference for the inverting (minus) input of both comparators U1 and U2. It should be noted that the value of resistor R5 is greater than the value of resistor R6. In the example of FIG. 3, the values of resistor R5 and resistor R6 are chosen to provide a 1.45V reference, which is slightly below the midpoint between the power rail and ground. Resistors R5 and R6 function as one preferred structure for carrying out the means for providing a reference voltage and the comparators U1 and U2 are preferred structures for carrying out the means for comparing the signal to the reference voltage. Those skilled in the art will appreciate that there are many other structures now known in the art or which will become available in the art which can carry out similar or equivalent functions and all such structures are intended to fall within the scope of the means for providing a reference voltage and the means for comparing the signal to the reference voltage.

In operation, when no positive and negative differential receive signals $RX^+$ & $RX^-$ network signal are present, comparators U1 and U2 see 1.65V on the non-inverting (plus) input and 1.45V on the inverting (minus) input, therefore the output of the comparators U1 and U2 is high. When a network signal is present, the AC component of the signal causes the voltage on the non-inverting (plus) inputs to vary above and below the 1.65V DC bias. When the voltage drops below 1.45V on the non-inverting (plus) input of either comparator U1 or U2, that comparator's output is driven low during that part of the AC cycle, indicating the presence of energy on the network receive lines $RX^+$ & $RX^-$. Because the network signals are differential, the voltage on one line rises above the DC bias at the same time the other line drops below the DC bias. In this way, no more than one comparator U1 or U2 will ever drive the output low at a given time. An explanation of the benefits which accrue by selecting 1.45V as the reference voltage and by including two comparators will be explained below.

Importantly, although the Ethernet specifications define proper connector pins and cabling for the positive and negative differential signals $RX^+$ & $RX^-$, it is known that wiring errors occur and the differential pair conductors get swapped creating a polarity error. Most transceivers have automatic polarity correcting circuitry built in so that network connections can still be made with the cabling which is wired with the differential pair conductors swapped. Advantageously, the example of the present invention represented in FIG. 3 provides proper operation even when the differential pair conductors are swapped by looking at both the positive and negative receive lines RX+ & RX− which preferably requires the inclusion two comparators U1 and U2.

In order to provide the preferred embodiment of the present invention represented in FIG. 3 with the greatest flexibility, both 10 and 100 Mbps Ethernet signals can be detected. The detection of 10 and 100 Mbps Ethernet signals involves three primary scenarios:

100 Mbps signals
10 Mbps link signals
10 Mbps data signals

Figure 4:
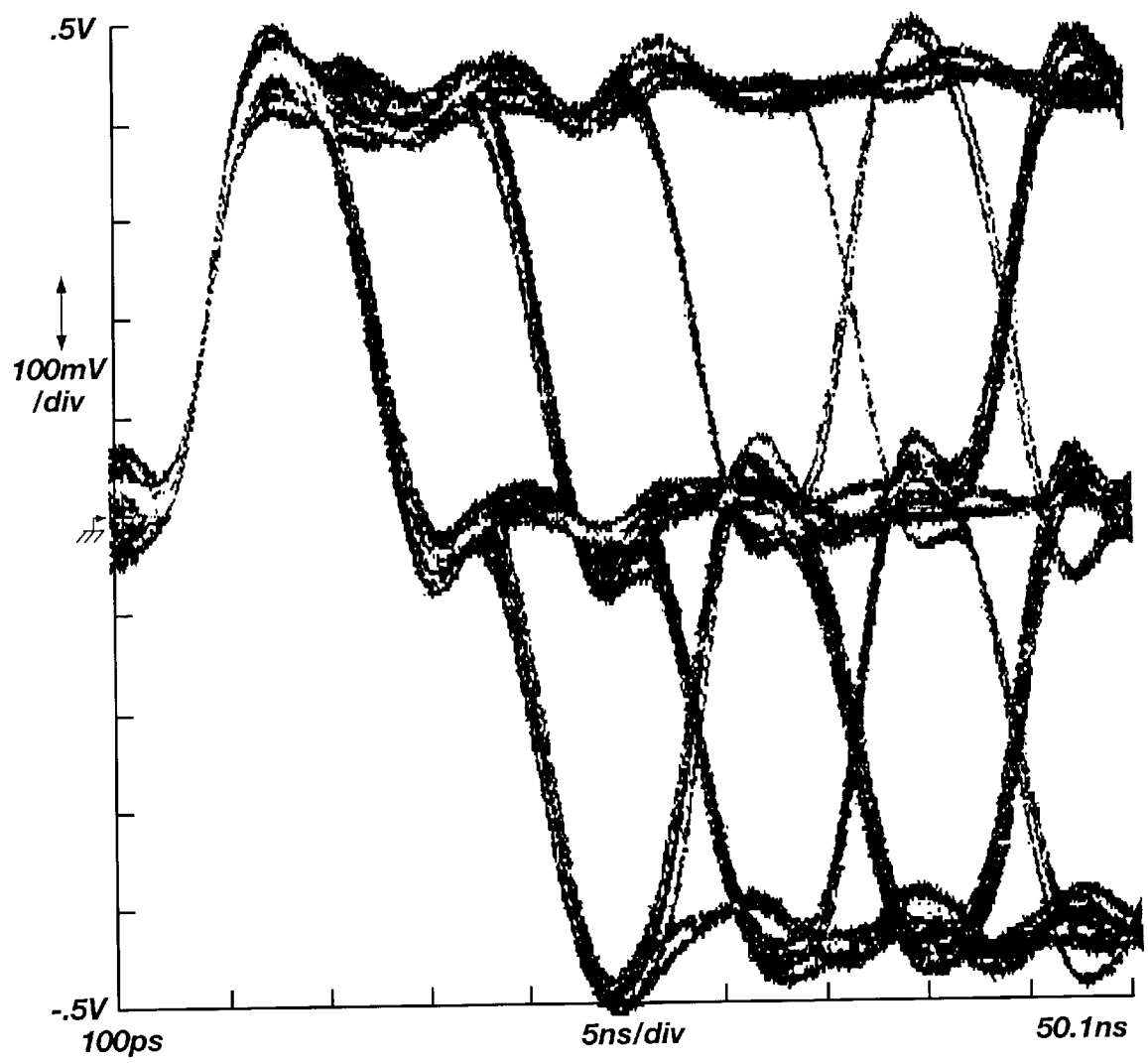
FIG. 4 is a representation of a waveform pattern typical of a 100 Mbps Ethernet signal.

FIG. 4 is a graphical representation of a typical eye pattern of a 100 Mbps Ethernet network signal which is present on each line of the differential receive pair RX+ & RX−. The eye pattern of FIG. 4 shows all the possible signal transitions over time. The 100 Mbps pattern looks the same whether data is being transmitted or the network is idle. The amplitude of the signal represented in FIG. 4 varies with network cable length, and ranges from 0.5 volt above to 0.5 volt below the DC bias level with a short cable, to 0.35 volts above and below the DC bias with a long cable. It will be appreciated that for the longest cables, the 100 Mbps signal voltage at the comparators will range from 1.30V to 2.00V. This range was taken into consideration when selecting the reference voltage for the comparators U1 and U2. The preferred value of 1.45V was selected for the reference voltage since this value for the reference voltages ensures that part of the network signal's AC cycle will drop below this value even with the longest cables. The 1.45V reference voltage value is also far enough away from the 1.65V DC bias on the network signal input so that random noise and the effects of component tolerances will not cause false indications.

Figure 5:
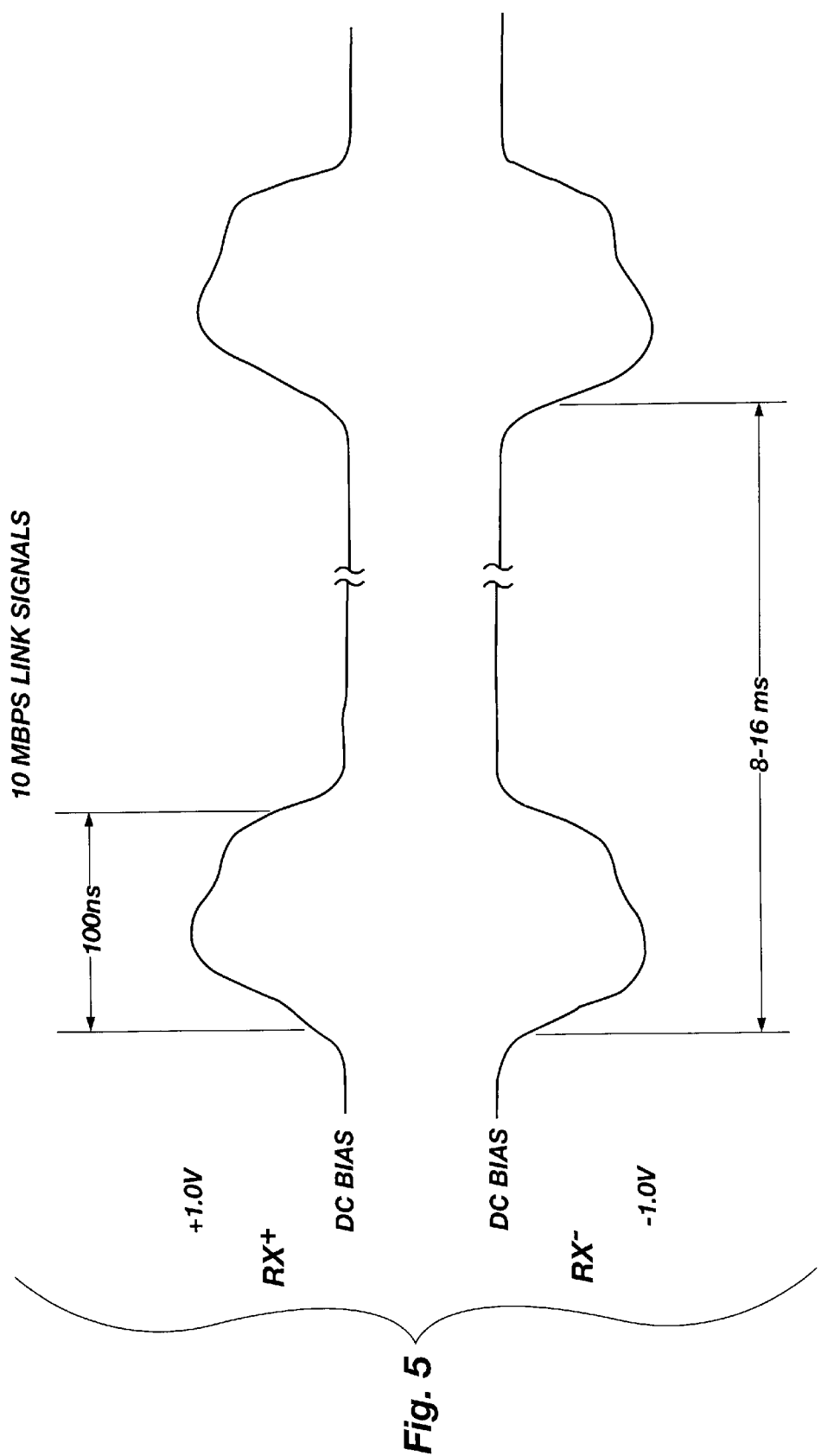
FIG. 5 is a representation of a waveform pattern typical of 10 Mbps Ethernet link signal.

FIG. 5 is a graphical representation showing a typical 10 Mbps link signal well-known in the Ethernet standard. The 10 Mbps link signal is a periodic signal occurring only once every 8–16 ms that is transmitted by the hub, switch, or router to advertise its presence. It is also transmitted after a connection has been made to the network and before data is transferred across the network to that connection. FIG. 5 shows that the 10 Mbps link signal creates a voltage that rises above the no-signal DC bias on the positive receive line RX+, and drops below the DC bias on the negative receive line RX− of the differential pair. It will be appreciated that the pertinent voltage will drop below the reference voltage on the comparators U1 and U2 only on the negative differential signal line RX−.

Figure 6:
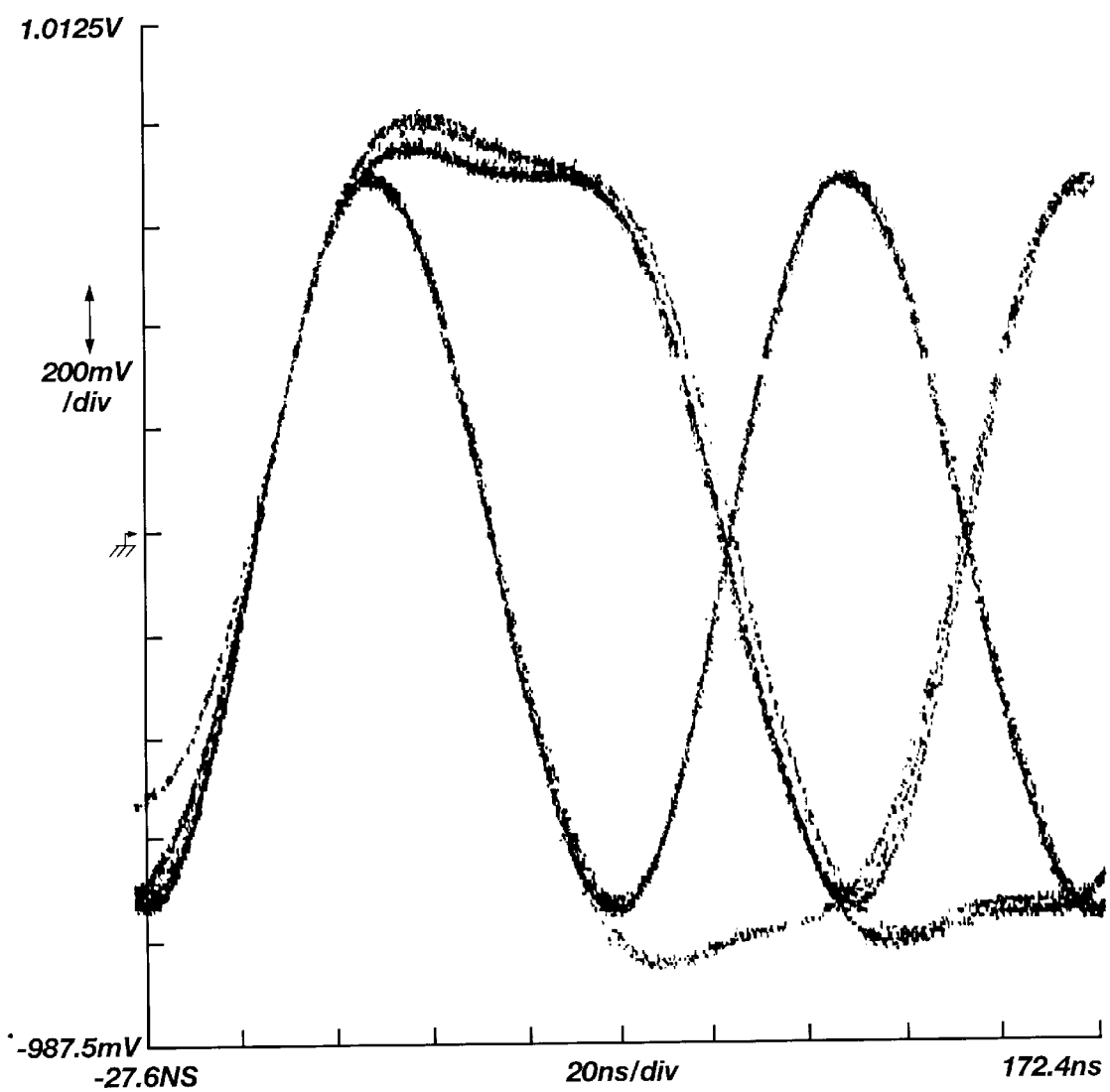
FIG. 6 is a representation of a waveform pattern typical of 10 Mbps eye pattern of an Ethernet signal when data is being transferred over the network.

FIG. 6 is a graphical representation showing a typical 10 Mbps eye pattern on one of the differential receive lines obtained when data is being transferred. In the case represented in FIG. 6, the voltage varies on both sides of the DC bias on each line of the differential pair. In the case of 10 Mbps signals, the voltage swings are greater and the signal frequencies are slower than is the case with 100 Mbps network signals. Those skilled in the art will appreciate that because of the characteristics of 100 Mbps Ethernet network signals and 10 Mbps Ethernet network signals, the preferred example of the present invention represented in FIG. 3 will advantageously detect the presence of both 100 Mbps Ethernet network signals and 10 Mbps Ethernet network signals.

Reference will next be made again to FIG. 3. Capacitor C3 and resistor R7 are one preferred example of an output shaping circuit, such as represented at 110 in FIG. 2. In the preferred example represented in FIG. 3, the signal which is output from the common output of the comparators U1 and U2 is referred to as /ENERGY_DETECT. The /ENERGY_DETECT signal is preferably conveyed to an input provided on the ASIC on the circuit board containing the other components on the network adapter card.

The /ENERGY_DETECT signal has the potential to create excessive noise which can interfere with the operation of other components on the network adapter card since the /ENERGY_DETECT signal will follow the network signal fluctuations and have the amplitude of a digital signal. To alleviate this problem, the open drain pullup resistor R7 preferably has a very large value and the capacitor C3 is connected from the signal to ground. It is preferred that R7 and C3 be selected to provide an appropriate RC time constant, preferably about 0.1 ms. It will be understood that since the comparators U1 and U2 are open drain, the high-to-low transition will be very fast since the comparators U1 and U2 preferably provide a low impedance (typically less than 100 ohms) path to ground. But when using the preferred open-drain comparators U1 and U2, the low-to-high transition will be extremely slow because of the large value of R7. It will be so slow that as long as 100 Mbps signals or 10 Mbps data signals are present, the output never has time to climb up to a high level. Enough high-to-low transitions will occur during operation to keep the /ENERGY_DETECT signal essentially at ground level, reducing any noise which can interfere with the operation of other components on the network adapter card.

Still referring to FIG. 3, it will now be understood that the need to detect the 10 Mbps link signal creates a special concern for the components which carry out the functions of the output shaping circuit 110. The period of time between signals (8–16 ms) is so long that in order to create a steady low /ENERGY_DETECT signal, as explained above regarding the 10 Mbps Ethernet data signals, the value of capacitor C3, as well as the value of resistor R7, would have to be very large to lengthen the time constant. But if the value of capacitor C3 is too large, the 100 ns pulse width of the link pulse is too short to sufficiently drain the charge out of capacitor C3 through the comparators U1 and U2, and the /ENERGY_DETECT signal will never go low. So the circuit in FIG. 3 advantageously represents a compromise for this preferred application, resulting in a virtually steady low /ENERGY_DETECT signal when 100 Mbps and 10 Mbps data network signals have been detected, and a pulsed low output /ENERGY_DETECT signal when 10 Mbps link signal network signal has been detected.

Provided below in Table A are examples of the preferred values of selected components represented in FIG. 3.

TABLE A

| | |
|---|---|
| C1 C2 | .01 μF |
| R1 R2 R3 R4 | 150K |
| U1 U2 | Open drain Comparators |
| R5 | 68.1K |
| R6 | 53.6K |
| C3 | 470 pF |
| R7 | 280K |

As explained earlier, the present invention can be used in many different applications, with the particular application of detecting 10 Mbps and 100 Mbps Ethernet network signals being just one preferred example of the present invention. Those skilled in the art will be able to, using the information contained herein, arrive at other applications which use a network cable energy detect circuit and will be able to arrive at other circuits for the particular network topologies used and the type of indication signal required by other components on the network adapter card. For example, those skilled in the art, using the information contained herein, can arrive at an additional embodiment of the present invention which does not look for either a steady or pulsed low level on the /ENERGY_DETECT signal. In such an additional embodiment, the apparatus preferably relies on the presence of continuous fluctuations to indicate presence of a network. If concerns about circuit board noise are minimal, such as with extremely short traces, the output shaping circuit can be eliminated and the elegant structure of an open drain pullup resistor (for example 5k ohms) is used on the output of the comparators.

The embodiments of the present invention taught herein advantageously solve the problems of excessive power consumption and electrical noise generation in an elegant fashion while reliably and efficiently giving an indication of whether or not a network signal is present in network signal conveying media, whether that media is twisted pair, coaxial, or fiber media. The embodiments of the present invention disclosed herein do not attempt to create a network connection; The embodiments of the present invention only monitor the receive lines of the conveying media to determine if there is electrical energy on the media in the form particular to the type of network which is being detected. The embodiments of the present invention preferably provide a hardware signal that is used by other logic on the network adapter card. The logic on the network adapter card may then interrupt the host computer when a change in network energy status is detected. This preferred arrangement allows the transceiver of the network adapter card to be put into the low-power mode continuously when there is no network signal present yet it permits a quick response and powering up of the transceiver when an active network signal is detected, such as when the conveying media is connected to a network hub, switch, or router. The power consumption of the embodiments of the present invention, and any supporting logic, is greatly less than that of the transceiver at full power. In a typical exemplary application, the power consumption of the embodiment of the present invention represented in FIG. 3, plus any additional logic, is 5 to 15 mW on network adapter PC Card using 3.3V components while a 3.3V transceiver at full power consumes 300–600 mW.

In view of the foregoing, it will be appreciated that the present invention provides a system and method for reducing the power consumed by a transceiver in a network adapter when the transceiver is not actively connected to a network and which extends the battery life of a battery operated portable computing device by reducing the power required by a network adapter when the adapter is not connected to the network. The present invention also provides a system and method for detecting when a network signal is present on a network conveying media which requires few additional components and which draws little power and which does not create excessive interfering noise and which is particularly suited for incorporation into a PC Card.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for detecting the presence of an active connection to a data transmission network, including a network medium, to a computing device, the system comprising:
    means for making a connection to the network medium, the means for making a connection to the network medium comprising:
        means for DC filtering of the signal;
        means for providing electrical isolation; and
        means for providing a DC bias;
        means for comparing any signal found on the network medium to a predetermined standard; and
        means for signaling the computing device when any signal found on the network medium is an active network signal.

2. A system as defined in claim 1 wherein the means for comparing any signal found on the network medium to a predetermined standard comprises:
    means for providing a reference voltage; and
    means for comparing the signal to the reference voltage.

3. A system as defined in claim 1 wherein the predetermined standard comprises a DC reference voltage.

4. A system as defined in claim 1 further comprising a network adapter card and wherein the means for making a connection to the network medium, the means for comparing any signal found on the network medium to a predetermined standard and the means for signaling the computing device are all located on the network adapter card.

5. A system as defined in claim 4 wherein the network adapter card comprises a PC Card.

6. A system as defined in claim 4 wherein the network adapter card is located within the computing device.

7. A system as defined in claim 1 wherein the network medium comprises a positive signal electrical conductor and a negative signal electrical conductor and the means for comparing any signal found on the network medium to a predetermined standard compares the signals regardless of the connection orientation of the positive signal electrical conductor and the negative signal electrical conductor.

8. A system as defined in claim 1 wherein the means for comparing any signal found on the network medium to a predetermined standard comprises a first comparator and a second comparator.

9. A system as defined in claim 1 wherein the means for comparing any signal found on the network medium to a predetermined standard comprises a first comparator and a second comparator, the first and the second comparators comprising open drain comparators having their outputs connected together.

10. A system as defined in claim 1 wherein the means for making a connection to the network medium and the means for comparing any signal found on the network medium to a predetermined standard do not significantly load the network medium when connected thereto.

11. A system as defined in claim 1 wherein the means for signaling the computing device when any signal found on the network medium is an active network signal comprises a output shaping circuit providing an output signal indicating when an active network signal is present on the network medium.

12. A system as defined in claim 1 wherein the means for signaling the computing device when any signal found on the network medium is an active network signal comprises an output shaping circuit having an RC time constant of about 0.1 ms.

13. A system as defined in claim 1 wherein the data transmission network complies to an Ethernet network standard.

14. A system as defined in claim 13 wherein the network medium comprises twisted pair cable.

15. A system as defined in claim 13 wherein the network medium comprises coaxial cable.

16. A system as defined in claim 13 wherein the network medium comprises fiber optic cable.

17. A system for indicating the presence of a data transmission network cable carrying an active network signal connected to a computing device, the system comprising:
   means for connecting to a network cable;
   means for DC filtering any signal present on the network cable;
   means for DC biasing any signal present on the network cable;
   means for providing a reference voltage;
   means for comparing any signal present on the network cable with the reference voltage; and
   means for signaling the computing device when any signal present on the network cable meets the reference voltage for at least a predetermined period of time and indicating that the signal present on the network cable is an active network signal.

18. A system as defined in claim 17 further comprising a network adapter card and wherein the means for connecting, the means for DC filtering, the means for DC biasing, the means for providing a reference voltage, the means for comparing, and the means for signaling are all located on the network adapter card.

19. A system as defined in claim 18 wherein the network adapter card is located within the computing device.

20. A system as defined in claim 18 wherein the network adapter card is located within the computing device.

21. A system as defined in claim 17 wherein the network cable comprises a positive signal electrical conductor and a negative signal electrical conductor and the means for comparing any signals compares the signals regardless of the connection orientation of the positive signal electrical conductor and the negative signal electrical conductor.

22. A system as defined in claim 17 wherein the means for comparing any signal comprises a first comparator and a second comparator.

23. A system as defined in claim 17 wherein the means for comparing any signal comprises a first comparator and a second comparator, the first and the second comparators comprising open drain comparators having their outputs connected together.

24. A system as defined in claim 17 wherein the means for connecting to a network cable presents a high impedance to the network cable.

25. A system as defined in claim 17 wherein the means for signaling the computing device an RC circuit having a time constant of about 0.1 ms.

26. A system as defined in claim 17 wherein the active network signal comprises a 10 Mbps Ethernet signal.

27. A system as defined in claim 17 wherein the active network signal comprises a 100 Mbps Ethernet signal.

28. A system as defined in claim 17 wherein the network cable comprises twisted pair cable.

29. A system as defined in claim 17 wherein the network cable comprises coaxial cable.

30. A system as defined in claim 17 wherein the network cable comprises fiber optic cable.

31. A method for detecting the presence of an active connection to a data transmission network, including a network medium, to a computing device, the method comprising the steps of:
   making a connection to the network medium and extracting a signal therefrom;
   DC filtering of the signal;
   providing electrical isolation;
   providing a DC bias; and
   comparing the signal found on the network medium to a predetermined standard; and
   signaling the computing device when any signal found on the network medium is an active network signal.

32. A method as defined in claim 31 wherein the step of comparing any signal found on the network medium to a predetermined standard comprises:
   providing a reference voltage; and
   comparing the signal to the reference voltage.

33. A method as defined in claim 31 wherein the step of making a connection to the network medium comprises the step of making a connection to the network medium without significantly loading the network medium.

34. A method as defined in claim 31 wherein the data transmission network complies with an Ethernet network standard.

35. A system for detecting the presence of an active connection to a data transmission network, including a network medium, to a computing device, the system comprising:
   means for making a connection to the network medium;
   means for comparing any signal found on the network medium to a predetermined standard; and
   means for signaling the computing device when any signal found on the network medium is an active network signal; and
   wherein the network medium comprises a positive signal electrical conductor and a negative signal electrical conductor and the means for comparing any signal found on the network medium to a predetermined standard compares the signals regardless of the connection orientation of the positive signal electrical conductor and the negative signal electrical conductor.

36. A system as defined in claim 32 wherein the means for making a connection to the network medium comprises;
   means for DC filtering of the signal;
   means for providing electrical isolation; and
   means for providing a DC bias.

37. A system as defined in claim 32 wherein the means for comparing any signal found on the network medium to a predetermined standard comprises:
   means for providing a reference voltage; and
   means for comparing the signal to the reference voltage.

38. A system as defined in claim 32 wherein the predetermined standard comprises a DC reference voltage.

39. A system as defined in claim 32 further comprising a network adapter card and wherein the means for making a connection to the network medium, the means for comparing any signal found on the network medium to a predetermined standard; and the means for signaling the computing device are all located on the network adapter card.

40. A system as defined in claim 36 wherein the network adapter card comprises a PC Card.

41. A system as defined in claim 36 wherein the network adapter card is located within the computing device.

42. A system as defined in claim 32 wherein the means for comparing any signal found on the network medium to a predetermined standard comprises a first comparator and a second comparator.

43. A system as defined in claim 32 wherein the means for comparing any signal found on the network medium to a predetermined standard comprises a first comparator and a second comparator, the first and the second comparators comprising open drain comparators having their outputs connected together.

44. A system as defined in claim 32 wherein the means for making a connection to the network medium and the means for comparing any signal found on the network medium to a predetermined standard do not significantly load the network medium when connected thereto.

45. A system as defined in claim 32 wherein the means for signaling the computing device when any signal found on the network medium is an active network signal comprises a output shaping circuit providing an output signal indicating when an active network signal is present on the network medium.

46. A system as defined in claim 32 wherein the means for signaling the computing device when any signal found on the network medium is an active network signal comprises an output shaping circuit having an RC time constant of about 0.1 ms.

47. A system as defined in claim 32 wherein the data transmission network complies to an Ethernet network standard.

48. A system as defined in claim 44 wherein the network medium comprises twisted pair cable.

49. A system as defined in claim 44 wherein the network medium comprises coaxial cable.

50. A system as defined in claim 44 wherein the network medium comprises fiber optic cable.

51. A system for detecting the presence of an active connection to a data transmission network, including a network medium, to a computing device, the system comprising:

means for making a connection to the network medium;

means for comparing any signal found on the network medium to a predetermined standard; and means for signaling the computing device when any signal found on the network medium is an active network signal; and wherein the means for comparing any signal found on the network medium to a predetermined standard comprises a first comparator and a second comparator, the first and the second comparators comprising open drain comparators having their outputs connected together.

52. A system as defined in claim 48 wherein the means for comparing any signal found on the network medium to a predetermined standard comprises a first comparator and a second comparator.

53. A system as defined in claim 48 wherein the means for comparing any signal found on the network medium to a predetermined standard comprises a first comparator and a second comparator, the first and the second comparators comprising open drain comparators having their outputs connected together.

54. A system as defined in claim 48 wherein the means for making a connection to the network medium and the means for comparing any signal found on the network medium to a predetermined standard do not significantly load the network medium when connected thereto.

55. A system as defined in claim 48 wherein the means for signaling the computing device when any signal found on the network medium is an active network signal comprises a output shaping circuit providing an output signal indicating when an active network signal is present on the network medium.

56. A system as defined in claim 48 wherein the means for signaling the computing device when any signal found on the network medium is an active network signal comprises an output shaping circuit having an RC time constant of about 0.1 ms.

57. A system as defined in claim 48 wherein the data transmission network complies to an Ethernet network standard.

58. A system as defined in claim 54 wherein the network medium comprises twisted pair cable.

59. A system as defined in claim 54 wherein the network medium comprises coaxial cable.

60. A system as defined in claim 54 wherein the network medium comprises fiber optic cable.

* * * * *

UNITED STATES PATENT AND TRADEMARK OFFICE
CERTIFICATE OF CORRECTION

PATENT NO. : 6,169,475 B1
DATED : January 2, 2001
INVENTOR(S) : Browning

It is certified that error appears in the above-identified patent and that said Letters Patent is hereby corrected as shown below:

Column 14,
Lines 47, 53, 58, and 60, delete "32" and insert -- 35 --.
Line 66, delete "36" and insert -- 39 --.

Column 15,
Line 1, delete "36" and insert -- 39 --.
Lines 3, 7, 13, 18, 24 and 29, delete "32" and insert -- 35 --.

Column 16,
Lines 9, 13, 19, 24, 30 and 35, delete "48" and insert -- 51 --.

Signed and Sealed this

Thirteenth Day of September, 2005

JON W. DUDAS
*Director of the United States Patent and Trademark Office*